US012372456B2

(12) United States Patent
Mejia-Morales et al.

(10) Patent No.: US 12,372,456 B2
(45) Date of Patent: Jul. 29, 2025

(54) OPTOACOUSTIC MONITORING DEVICE FOR CELL CHARACTERIZATION

(71) Applicants: UNIVERSITÉ CÔTE D'AZUR, Nice (FR); CENTRE NATIONAL DE LA RECHERCHE SCIENTIFIQUE, Paris (FR); CONSIGLIO NAZIONALE DELLE RICERCHE, Rome (IT)

(72) Inventors: Julian Mejia-Morales, Salamanca (MX); Gian Luca Lippi, Nice (FR); Massimo Vassalli, Genoa (IT)

(73) Assignees: UNIVERSITÉ CÔTE D'AZUR, Nice (FR); CENTRE NATIONAL DE LA RECHERCHE SCIENTIFIQUE, Paris (FR); CONSIGLIO NAZIONALE DELLE RICERCHE, Rome (IT)

(*) Notice: Subject to any disclaimer, the term of this patent is extended or adjusted under 35 U.S.C. 154(b) by 183 days.

(21) Appl. No.: 18/247,134

(22) PCT Filed: Oct. 1, 2021

(86) PCT No.: PCT/EP2021/077202
§ 371 (c)(1),
(2) Date: Mar. 29, 2023

(87) PCT Pub. No.: WO2022/069752
PCT Pub. Date: Apr. 7, 2022

(65) Prior Publication Data
US 2023/0366805 A1 Nov. 16, 2023

(30) Foreign Application Priority Data
Oct. 2, 2020 (EP) .................................... 20306149

(51) Int. Cl.
G01N 15/14 (2024.01)
G01N 15/0205 (2024.01)
(Continued)

(52) U.S. Cl.
CPC ..... *G01N 15/1436* (2013.01); *G01N 15/0205* (2013.01); *G01N 15/1429* (2013.01);
(Continued)

(58) Field of Classification Search
CPC .............. G01N 15/01; G01N 15/0205; G01N 15/1429; G01N 15/1434; G01N 15/1436;
(Continued)

(56) References Cited

U.S. PATENT DOCUMENTS 11,670,658 B2 * 6/2023 Ockenfuss ............ G01J 3/2803
257/292
2012/0196356 A1 8/2012 Wagner et al.
(Continued)

FOREIGN PATENT DOCUMENTS

WO 2012068287 A2 5/2012
WO 2013173446 A1 11/2013
WO 2017112896 A1 6/2017

OTHER PUBLICATIONS

International Search Report issued on Dec. 21, 2021, in corresponding application No. PCT/EP2021/077202, 2 pages.
(Continued)

*Primary Examiner* — Jamil Ahmed
(74) *Attorney, Agent, or Firm* — Maier & Maier, PLLC

(57) ABSTRACT

A monitoring device of biological cells including: a fluidic channel in which a fluid including biological cells is made to flow, including a first and second glass walls placed in parallel and a reflective surface adjoined to the second wall; and a piezoelectric transducer, the piezoelectric transducer emitting acoustic waves creating a force acting on the biological cells, making them flow substantially along a single motion plane. The external interface between the first wall and the exterior of the fluidic channel and the reflective surface are configured to function as a Fabry-Perot interfer-
(Continued)

ometer, such that the motion planes sensibly perpendicular to the optical axis of the Fabry-Perot interferometer. The finesse of the interferometer is lower than 10. The monitoring device further includes a detecting unit detecting a fringe pattern stemming from the Fabry-Perot interferometer and an analysing device, analysing the fringe pattern and configured to output data on physical properties of the cells based on the pattern.

19 Claims, 3 Drawing Sheets

(51) Int. Cl.
    *G01N 15/1429*     (2024.01)
    *G01N 15/1434*     (2024.01)
    *G01N 21/05*     (2006.01)
    *G01N 21/17*     (2006.01)
    *G01N 21/45*     (2006.01)
    G01N 15/01     (2024.01)
    G01N 15/1404     (2024.01)

(52) U.S. Cl.
    CPC ..... *G01N 15/1434* (2013.01); *G01N 15/1459* (2013.01); *G01N 15/1484* (2013.01); *G01N 21/05* (2013.01); *G01N 21/1717* (2013.01); *G01N 21/45* (2013.01); *G01N 2015/012* (2024.01); *G01N 2015/142* (2013.01); *G01N 2015/1454* (2013.01); *G01N 2015/1497* (2013.01); *G01N 2021/1729* (2013.01)

(58) Field of Classification Search
    CPC ........... G01N 15/1459; G01N 15/1484; G01N 2015/1006; G01N 2015/142; G01N 2015/1454; G01N 2015/1493; G01N 2015/1495; G01N 2015/1497; G01N 2021/0346; G01N 2021/058; G01N 2021/1729; G01N 21/05; G01N 21/1717; G01N 21/45; G01N 2015/012

See application file for complete search history.

(56) References Cited

U.S. PATENT DOCUMENTS

| | | | | |
|---|---|---|---|---|
| 2015/0308971 | A1* | 10/2015 | Bisgaard | G01N 15/12 435/287.1 |
| 2017/0184486 | A1* | 6/2017 | Mach | G01N 15/1425 |
| 2020/0103395 | A1* | 4/2020 | Bosy | G01N 33/491 |
| 2021/0140881 | A1* | 5/2021 | Hassell | G01N 21/3577 |

OTHER PUBLICATIONS

Hua Shao et al: "Single-Cell Detection Using Optofluidic Intracavity Spectroscopy", IEEE Sensors Journal, IEEE, USA, vol. 6, No. 6, Dec. 2006 (Dec. 2006), pp. 1543-1550, 8 pgs.

Morales Julian Mejia et al: "Acoustofluidic Interferometric Techniques for Single Cell Optical Phenotyping", Biophysical Journal, Elsevier, Amsterdam, NL, vol. 118, No. 3, Feb. 7, 2020 (Feb. 7, 2020), p. 164a, 1 pgs.

Kyung Eun You et al. "Highly sensitive detection of biological substances using microfluidic enhanced Fabry-Perot etalon-based optical biosensors", Sensors & Actuators B Chemical, 2018, pp. 62-68, 7 pgs.

Robert Zmijan et al. "High throughput imaging cytometer with acoustic focussing", RSC Advances, 2015, pp. 83206-83216, 11 pgs.

Bei Jang et al., "Continuous detection of micro-particles by fiber Bragg grating Fabry-Pérot flow cytometer", Optics Express, vol. 26, No. 10, May 14, 2018, 6 pgs.

W. Z. Song et al., "Refractive index measurement of single living cells using on-chip Fabry-Pérot cavity", Applied Physics Letters 89, 203901, 2006, 4 pgs.

\* cited by examiner

OPTOACOUSTIC MONITORING DEVICE FOR CELL CHARACTERIZATION

FIELD

The invention relates to the field of observation of biological cells. More particularly, it concerns the field of monitoring devices for cell characterization.

BACKGROUND

Some diseases such as cancer, malaria or sickle cell diseases can be detected by observing their physical properties, such as their shape or mechanical properties like their stiffness or response to mechanical stimuli. For example, as its name implies, sickle cell disease manifests itself by sickle-shaped cells, while decreased cell stiffness is correlated with metastasis potential.

It is known to observe biological cells to characterize them in relation to a type of disease. For example, prior art document WO2017112896 discloses an optical device for performing cell analysis based on a Brillouin spectroscopy or using a Fabry-Perot interferometer. However, the speed and accuracy of the observation obtained through this kind of device is limited.

A Fabry-Perot interferometer is a device in which a light beam bounces back and forth between mirrors to provide sharp interference features (in transmission and reflection). From it one can retrieve phase shifts between the light beam originating from small changes in the optical path between the two mirrors. For fixed-distance mirrors, the phase shift is only due to refractive index change of the medium. This allows for monitoring the deformation and size of the cells in real-time through the optical fringe changes, thereby collecting a signal that integrates information on the cell's physical (deformation) and optical (refractive index) properties.

The figure of merit of a Fabry-Perot interferometer is the finesse, which quantifies the sharpness of the resonances. Typical Fabry-Perot interferometer finesse values exceed 10, or even 100 for precision phase shift measurements.

However, a typical high finesse Fabry-Perot interferometer presents several disadvantages in the context of the observation of biological cells.

Firstly, a high-Finesse configuration is incompatible with high throughput, in addition to presenting difficulties in the implementation of the acoustic focusing. Indeed high-finesse configurations require the cells to be immobilized for the whole duration of the measurement with a good degree of stability. As a result, only a very small measurement throughput can be expected, since the cell would have to be identified, captured, correctly positioned and properly held before each measurement. Moreover, fringe shift measurements require high stability at the interferometric level, necessitating, on the one hand, continuous calibration (e.g, for changes in pressure inside the fluidic channel) and, on the other hand, excellent overall mechanical stability.

Moreover, a continuous flow of cells would be impossible to observe and the gain from the microfluidic setup would be negligible (aside from the expense).

In addition, a high mechanical and optical stability is required, since the phase shifts to be measured can be very small. This requires a narrow linewidth in the laser used to generate the light beams, as well as continuous calibration to subtract the thermal and mechanical contributions from the measured phase shift. This increases the costs of the optical arrangement.

These requirements render the choice of a high-finesse configuration impractical for an instrument whose vocation is flexibility and ease of use. In other words, the traditional high-quality interferometric approach is not suitable for a rugged and low-cost device to be deployed in the field and to be used by unskilled personnel. The main purpose of the invention is to provide a monitoring device of biological cells able to observe and analyse their physical properties in a fast, accurate and cheap manner.

SUMMARY

To that end, the invention relates to a monitoring device of biological cells comprising:
- a fluidic channel in which a fluid comprising biological cells is made to flow, comprising a first and second glass walls placed in parallel and a reflective surface adjoined to the second wall, the first and second walls,
- a piezoelectric transducer, said piezoelectric transducer emitting acoustic waves creating a force acting on the biological cells, making them flow substantially along a single motion plane,
- an optical arrangement including a Fabry-Perot interferometer having an optical axis that is perpendicular to said motion plane, wherein the reflective surfaces are configured to function as a Fabry-Perot interferometer, the finesse of which is lower than 10, such that the motion plane is sensibly perpendicular to the optical axis of the Fabry-Perot interferometer, the monitoring device further comprising a detection unit detecting a fringe pattern stemming from the Fabry-Perot interferometer, and an analysing device, analysing said fringe pattern and configured to output data on physical properties of the cells based on said pattern.

Owing to the fact that the Fabry-Perot geometry is used in an entirely non-standard way, i.e. using a low-finesse ("quasi two-beam") configuration, the disadvantages linked to a high finesse solution listed above are avoided.

In particular, a low finesse allows a high throughput potential in optomechanical properties-based cytometry. Indeed, it offers better flexibility for the integration of the cells' acoustic manipulation.

Thanks to this low finesse, the invention in turn allows for an extremely simple design, as it is sufficient to adjoin a reflective surface to one of the walls of the fluidic channel. There is thus no need to provide additional components such as mirrors, holders and precision mechanics. In addition, it is free from the need for alignment and periodic checks, unlike traditional two-beam interferometers where different optical paths have to be set up and periodically tested and calibrated. A single set of optics is used for the focusing and retrieval of the two beams (incident and reflected). The monitoring device is therefore compact and fairly simple to manufacture.

In addition, the monitoring device has a smaller footprint considering the interferometer is as large as the microchannel itself, unlike two-beam interferometers which require space for the second, reference beam, hence also reducing the complexity and costs of the monitoring device. Moreover, the monitoring device is mechanically robust as the interferometer is monolithic, since it is constituted by the channel walls.

On the other hand, the drawbacks of a low-Finesse operation such as measurement sensitivity are avoided, due to the fact that the measurement device analyses the interference pattern, rather than the transfer function as normally done in phase measurement. In other words, the invention does not rely on measuring the phase shift, but, rather, the fringe pattern change in Free Spectral Range (FSR)—displacement of the set of fringes which emerge at different angles of the plano-planar interferometer—and the fringe Full Width at Half Maximum (FWHM)—Fringe linewidth.

To that end, the piezoelectric transducer making the cells flow substantially along a single motion plane allows for controlling the position of the cells. This provides the knowledge of the object's position along the propagation direction of the light which is necessary to analyse the interference pattern, as the cell positioning between the two mirrors affects said pattern.

Acoustic focusing is particularly suited to the positioning needs as it is a size-independent, non-invasive technique, fully compatible with the interferometer. Moreover the cells may be aligned in the desired plane over a long distance without the need for further intervention nor by having to dilute them, as hydrodynamic methods necessarily do. The obtained positioning is also quite accurate (at the micrometer level), satisfying the required precision for the interferometer. Furthermore, depending on the amplitude of the acoustic wave, the latter can not only position, but also compress the cell. The pressure wave can easily be modulated in time, allowing for a (future) probing of additional cellular features with the interferometric measurement.

The proposed monitoring device is also contactless, thus enabling a large throughput and ensuring an aseptic environment. Since the measurement setup does not come into physical contact with the cells, it is easy to implement a closed system where cells contaminated with highly contagious diseases can be safely tested.

The invention overall provides a fast and inexpensive reading of physical parameters for single cells, potentially carrying information about intracellular state in the texture/shape of the profile.

Advantageously, the piezoelectric transducer is set at a frequency that matches the fundamental resonance frequency of the fluidic channel. Such frequency is defined by the physical separation of the channel walls and the speed of sound of the medium through the so-called dispersion relation (valid for any wave). When the fundamental frequency of the microfluidic channel is matched, a standing wave (with nodes in the microfluidic channel walls) is created. Such a standing wave allows for the creation of acoustic potential and kinetic energy fields. The acoustic potential energy has its maximum near to the channel walls and minimum in the center. Similarly, the kinetic energy has its maximum in the center and its minimum in the channel walls. Such acoustic fields allow for cell alignment along the z-axis of the device, perpendicular to the direction of motion of the cells.

Advantageously, the physical properties of the cells are taken from at least one of the following, alone or in combination:
  mechanical properties of the cells,
  shape of the cells,
  refractive index of the cells,
  deformability of the cells.

These are indeed the main physical properties that can show if a cell is linked to a particular disease.

Preferably, the analysing device retrieves from the detected fringe pattern the distance between the optical axis of the Fabry-Perot interferometer and at least two fringes of the fringe pattern.

When an acoustically focused cell crosses the Fabry-Perot cavity formed by the channel, it perturbs the resonator fringe pattern (mathematically described by the Airy transmission function). Said cell-induced fringe pattern perturbations can be modelled as a modification of the Fabry-Perot's resonator fringe pattern induced by a thin lens. The mathematical model used to describe the cell-resonator interaction is developed using propagation ray-matrices and is based on the distance from the optical axis of the interferometer to the n-th intensity fringe of the pattern. These distances are used to compute the radius of curvature of the wavefront exiting the resonator which interferes with the incoming light beam. Since the cell is modelled as a thin lens, it is possible to associate a focal length to the cell. The cell focal length and the finesse are the parameters used to summarize and analyse the cell optomechanical properties. For instance, using the thin lens formula, its equivalent focal lens can be obtained. Then, the equivalent optical cell radius, connected to the focal length of the associated thin lens, can be obtained once the cell refractive index is known.

Preferably, the finesse of the Fabry-Perot interferometer is lower or equal to 1, preferably comprised between 0.5 and 0.7, even more preferably substantially equal to 0.6.

According to a preferred embodiment, the reflective surface is sandwiched between the second wall and the piezoelectric transducer.

The operation of a Fabry-Perot as two-beam interferometer results from a suitable choice of mirror reflectivity. Preferably, the optical reflectivity of the reflective surface is above 90%, preferably substantially equal to 99%, and the optical reflectivity of the interface between the first wall and the outside of the fluidic channel, for example air, is above 2%, preferably above 4%. Having an optical reflectivity under 2% would give rise to too much background noise. A value of 4% optical reflectivity corresponds to the natural reflectivity of glass in air, which is found to give satisfactory results.

According to a preferred embodiment, the monitoring device also comprises an acoustic reflector for reflecting the acoustic waves emitted by the piezoelectric transducer so that the acoustic waves become stationary within the fluidic channel. This particular arrangement tunes the waves emitted by the piezoelectric transducer to induce a stationary acoustic wave in the acoustic cavity formed by the fluidic channel, which provides a better alignment of the flowing cells along the motion plane.

In order to further simplify the design of the monitoring device, the first wall of the fluidic channel functions as an acoustic reflector for the acoustic waves emitted by the piezoelectric transducer.

According to a preferred embodiment, the monitoring device comprises an acoustic wave frequency modulator configured to modulate the frequency of the acoustic waves generated by the piezoelectric transducer.

Preferably, the frequency of the acoustic waves emitted by the transducer is set at the resonant frequency of the fluidic channel. This allows one to obtain an ever better focusing of the cells in the motion plane. For example, for a channel the walls of which are separated by a length of approximately 100 microns, the frequency of the acoustic waves is chosen at approximately 6.7 MHz.

According to a preferred embodiment of the invention, the monitoring device comprises an acoustic wave amplitude modulator configured to modulate the amplitude of the acoustic waves generated by the piezoelectric transducer. This allows for inducing significant deformation of the cells, which is therefore easier to observe. To that end, the amplitude of the acoustic waves is chosen depending on the size of the cells.

In order to obtain time traces containing the fringe pattern, to calibrate the device and to validate the results, the detection unit comprises at least two optical detectors recording time traces at different points along the motion plane and one camera for calibration. This also facilitates the retrieval of data about cell size and refractive index.

According to a preferred embodiment, the optical arrangement comprises a laser-emitting device emitting a laser beam focused by a focus lens, for example a microscope objective, into a zone of the Fabry-Perot interferometer. A focused laser beam allows for a simple and accurate fringe pattern recognition.

Preferably, the laser beam is aligned perpendicularly with the motion plane.

In order to simplify the design of the monitoring device, the focus lens is also used to retrieve the reflected laser beam carrying the detected fringe pattern.

Advantageously, the monitoring device comprises at least one beam splitter, the reflected laser beam being redirected by said at least one beam splitter to reach the optical detectors. This allows for a flexible arrangement of the components of the monitoring device in an allotted space.

BRIEF DESCRIPTION OF THE FIGURES

The invention will be better understood in view of the following description, referring to the annexed Figures in which.

DETAILED DESCRIPTION

Figure 1:
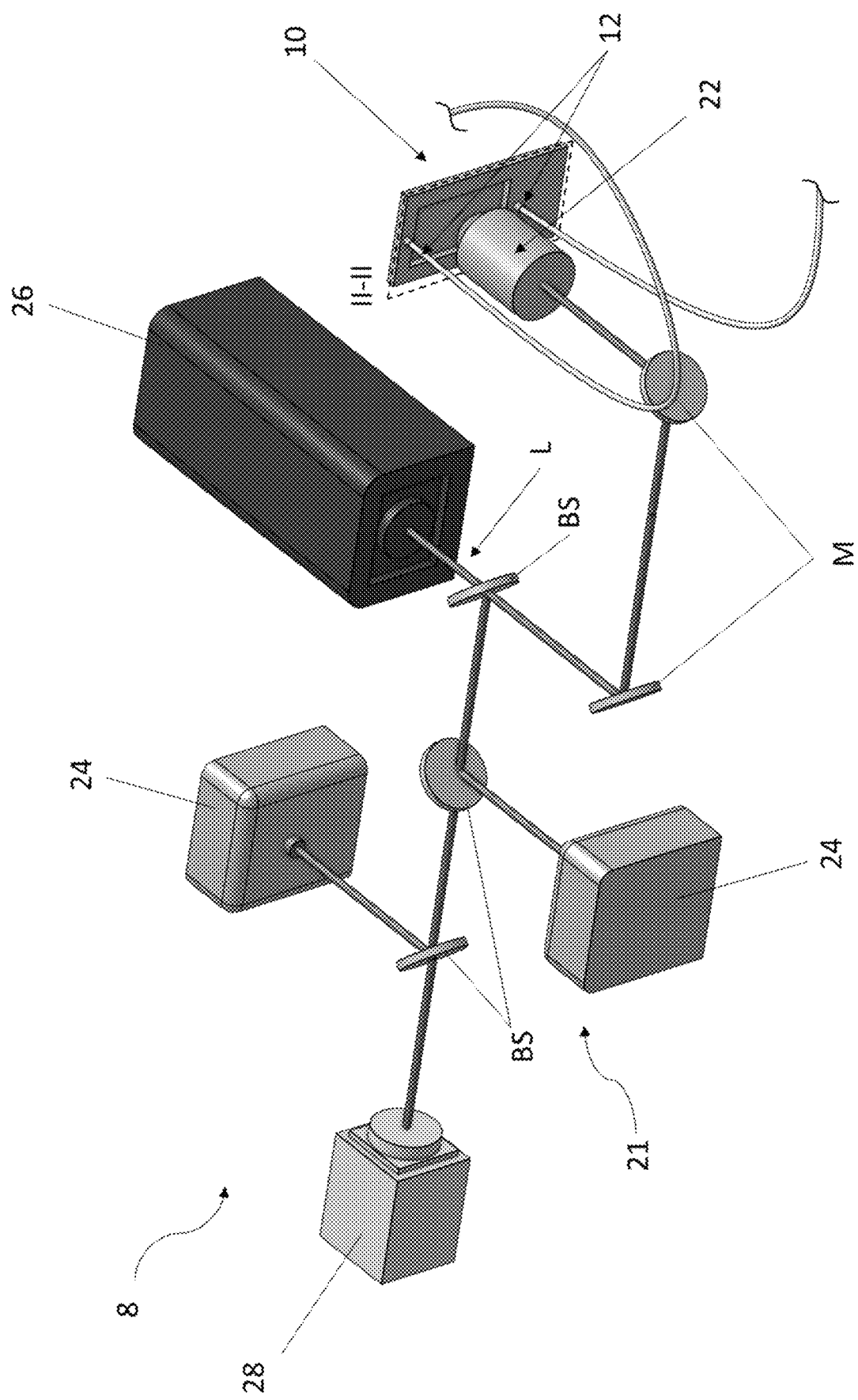
FIG. 1 is a schematic view in perspective of a monitoring device according to the invention.

FIG. 1 illustrates a monitoring device 8 of biological cells according to the invention.

Figure 2:
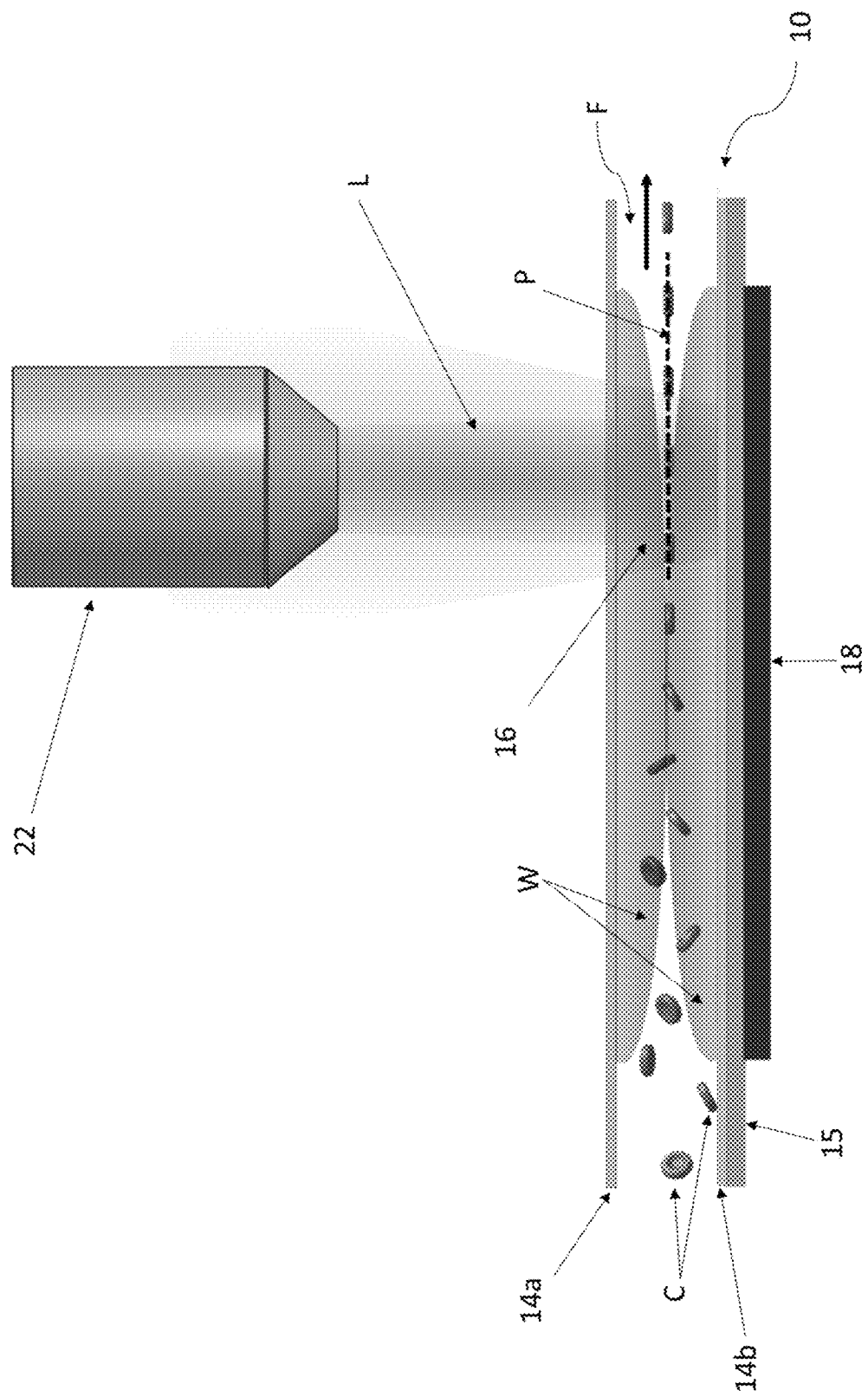
FIG. 2 is a cut view along plane II-II of the fluidic channel of the monitoring device according to the invention.

Monitoring device 8 comprises a fluidic channel 10, better shown on FIG. 2, in which a fluid F comprising biological cells C is made to flow. The cell fluid F is introduced through syringe channels 12, one syringe channel 12 being placed at one side of the fluidic channel 10 to introduce the fluid F in the fluidic channel 10, and the other at the other side of the fluidic channel 10 to evacuate the fluid F from the fluidic channel 10. Cell fluid F may be water.

Fluidic channel 10 comprises a first and second parallel glass walls 14a, 14b. A reflective surface 15 is adjoined to the second wall 14b. The external interface of the glass wall 14a in contact with the exterior of the fluidic channel 10, here air, and the reflective surface 15 are configured to function as a Fabry-Perot interferometer 16.

Preferably, the optical reflectivity of the reflective surface 15 is above 90%, preferably substantially equal to 99%. Reflective surface 15 may be a mirror. The optical reflectivity of the interface between the glass wall 14a and air is above 2%, preferably above 4%. Having an optical reflectivity under 2% would give rise to too much background noise. A value of 4% optical reflectivity corresponds to the natural reflectivity of glass in air, which is found to give satisfactory results. A partially transparent mirror can also be used for channel wall instead of a glass wall. This would allow for obtaining an optical reflectivity of 10% for wall 14a, for example.

Such reflectivities lead to coefficient of finesse around 0.15, corresponding to a finesse of 0.6.

Monitoring device 10 also includes a piezoelectric transducer 18, that is placed proximate to one of the walls 14b of the fluidic channel 10 and emits acoustic waves W towards the fluidic channel.

Acoustic waves W create a force acting on the biological cells C, making them flow substantially along a single motion plane P, shown on FIG. 2.

Monitoring device 10 also comprises an acoustic reflector for reflecting the acoustic waves W emitted by the piezoelectric transducer 18 so that the acoustic waves W become stationary within the fluidic channel 10.

In the preferred embodiment shown on the Figures, wall 14a functions as an acoustic wave reflector for acoustic waves W emitted by piezoelectric transducer 18.

Owing to this particular arrangement, motion plane P is parallel to the walls 14a, 14b of the fluidic channel 10. Hence, the optical axis of the Fabry-Perot interferometer 16 is perpendicular to motion plane P. More specifically, the acoustic waves W generated by the piezoelectric transducer 18 aligns the cells C onto the plane P corresponding to the wave's node at the centre of the microfluidic channel 10, i.e. substantially at an equal distance from each wall 14a, 14b.

Preferably, the monitoring device also comprises an acoustic wave frequency modulator (not shown on the Figures) configured to modulate the frequency of the acoustic waves W generated by the piezoelectric transducer 18.

The acoustic frequency is preferably set to the resonance of the fluidic channel 10, while the amplitude is selected to ensure good focusing. The acoustic focus confines the cells C in the laminar flow region.

In addition to the function of making the cells C flow along a motion plane P, if the amplitude of the standing wave is large enough, the cells C are deformed.

Hence, in order to induce further significant control and deformation of the cells C, monitoring device 10 may also comprise an acoustic wave amplitude modulator (not shown on the Figures), configured to modulate the amplitude of the acoustic waves W generated by the piezoelectric transducer 18. The amplitude of the acoustic waves W generated by the piezoelectric transducer 18 is chosen depending on the size, shape and type of the cells C.

Monitoring device also includes a detection unit 21, shown on FIG. 1, detecting a fringe pattern stemming from the Fabry-Perot interferometer 16.

In particular, according to the preferred embodiment of the invention illustrated in the Figures, the detection unit 21 comprises a focus lens 22, for example a microscope objective, placed so that its focal plane matches the cell plane of movement P.

Monitoring device 8 also includes a laser-emitting device 26 emitting a beam L illuminating a zone of the optical cavity 16. Laser beam L is aligned perpendicularly to motion plane P. Hence, laser beam is aligned in a direction that is parallel to the optical axis of the Fabry-Perot interferometer 16. The laser beam is preferably a Helium-Neon laser beam which provides for a satisfactory fringe pattern from the Fabry-Perot interferometer 16 results, however other laser beams can be used.

The laser beam L introduced in the optical cavity 16 is reflected by the glass wall 14a and mirror 15 acting as the Fabry Perot resonator. Said reflected laser beam L is retrieved by the detection unit 21.

In this particular embodiment, focus lens 22 is used to retrieve the reflected laser beam L.

In order to increase the quality of the measurements, the detection unit 21 also comprises at least two optical detectors 24 recording time traces at different points along the motion plane P of the biological cells C. This facilitates the retrieval of data about the physical properties of the cells C. A camera 28 is also included in the detection unit 21 for calibration.

Preferably, the detection unit also includes a plurality of beam splitters BS and mirrors M used to redirect the reflected laser beam L towards detectors 24 and camera 28. The arrangement of mirrors M and beam splitters BS will naturally vary according to the positioning of the optical detectors 24, laser emitting device 26 and camera 28 in the monitoring device 10 setup.

Monitoring device 8 also comprises an analysing device (not shown on the Figures) analysing the fringe pattern stemming from the Fabry-Perot interferometer 16 and configured to output data on the cells' C physical properties based on said pattern.

In the present embodiment shown in the Figures, the analysis of the fringe pattern when the cells C flow along the motion plane P provides direct information about their shape and optical thickness.

However, other physical properties of the cells C can be obtained using the monitoring device 10, such as:
- mechanical properties of the cells,
- shape of the cells,
- refractive index of the cells,
- deformability of the cells.

When an acoustically focused cell crosses the Fabry-Perot cavity formed by the channel, it perturbs the resonator fringe pattern (mathematically described by the Airy transmission function). Said cell-induced fringe pattern perturbations can be modelled as a modification of the Fabry-Perot's resonator fringe pattern induced by a thin lens. The mathematical model used to describe the cell-resonator interaction is developed using propagation ray-matrices and is based on the distance from the optical axis of the interferometer to the n-th intensity fringe of the pattern. These distances are used to compute the radius of curvature of the wavefront exiting the resonator which interferes with the incoming light beam.

The width of the fluidic channel L, is much larger than the cells C diameter $\ell$: $L \geq 10 \times \ell$. The broad channel width is chosen to enable the establishment of an acoustic standing wave at frequencies which can be attained with standard piezotransducers (size and cost issues). In addition, it ensures the avoidance of edge effects (channel sides) both in the velocity and in the pressure fields.

The resulting large-gap interferometer possesses the additional advantage of permitting the observation of changes in the Resonator Fringe Pattern (RFP) induced by the presence of an intracavity cell, as opposed to the simple phase-shift typical of small-gap (L≈$\ell$) Fabry-Perot resonators.

A thin-lens model may be used to reconstruct the fringe pattern perturbation induced by an intracavity cell. First, a ray-matrix approach describes the light propagation in the low-Finesse Fabry-Perot resonator (with the inclusion of a generic thin lens—as cell proxy). Next, the radius of curvature of the reflected wave is computed to retrieve the Cell Focal Length (CFL).

Taking into account the refractive index of each medium, the optical path, denoted by a tilde over the corresponding symbol, becomes:

$$\tilde{L} = n_w L \quad (1)$$

$$\tilde{l}_c = n_g l_c \quad (2)$$

$$\tilde{l}_m = n_g l_m \quad (3)$$

Where $n_w$ and $n_g$ are the fluid F (here water) and glass refractive indices, respectively, and:

$$\mathcal{L}_1 = \tilde{l}_c + \frac{1}{2}\tilde{L} \quad (4)$$

$$\mathcal{L}_2 = \tilde{L}_c + 2\tilde{l}_m \quad (5)$$

are the optical paths measured on either side of the lens.

A spherical lens, placed in the center of the microfluidic channel (acoustic focusing plane), approximates the cell with a radius of curvature $r_c$ and refractive index $n_c$.

Using the thin lens formula (1), one can obtain its equivalent focal lens:

$$f_c = \frac{r_c}{2(n_c - n_w)_C} \quad (6)$$

The focal distance is assumed to be very long, $f_c \gg r_c$, justifying the thin lens approximation. In the system according to the invention, $$\frac{f_c}{r_c} = \frac{1}{2(n_c - n_w)} \gg 1$$

due to the closeness of the medium's (fluid within the fluidic channel) and cells' C refractive indices (typically within a few percent).

Thus, the focal length is always much larger than the cell radius. It should however be noted that the focal length is not required to be small compared to the resonator's length (and is not even necessarily expected to be so).

The beam evolution inside the resonator can be computed with the beam propagation matrices:

$$\tilde{M} = M_{\mathcal{L}_1} \cdot M_\ell \cdot M_{\mathcal{L}_2} \cdot M_\ell \cdot M_{\mathcal{L}_1} \quad (7)$$

where the expressions for the various matrices are (3):

$$M_{\mathcal{L}_1} = \begin{pmatrix} 1 & \mathcal{L}_1 \\ 0 & 1 \end{pmatrix} \quad (8)$$

$$M_{\mathcal{L}_2} = \begin{pmatrix} 1 & \mathcal{L}_2 \\ 0 & 1 \end{pmatrix} \quad (9)$$

$$M_\ell = \begin{pmatrix} 1 & 0 \\ -\frac{1}{f_c} & 1 \end{pmatrix} \quad (10)$$

$f_c$ is the cell's focal length defined above in equation. (6), $M_{\mathcal{L}_1}$ represents the propagation between the resonator entrance (considered as the first wall glass-air interface) and the thin lens.

The thin lens, represented by $M_\ell$, is symmetrically placed inside the acoustic channel and $M_{\mathcal{L}_2}$ is the roundtrip from the thin lens, to the mirror and back to the lens.

At this level of approximation, the reflection at the glass-fluid interface of the walls 14a, 14b is ignored given that the reflection coefficient at normal incidence, computed with:

$$r = \left(\frac{n_1 - n_2}{n_1 + n_2}\right)^2 \quad (11)$$

where $n_1$ and $n_2$ are the refractive indices for the two media, indicates that the fluid-glass interface contributes ten times less than the air-glass one ($R_{air-glass} \approx 0.04$ and $R_{glass-water} \approx 0.004$, respectively).

The combined reflectivity $R_{air-glass}$ and $R_{mirror}=0.9$ produce for the empty resonator (no cell, thus no thin lens) a Finesse=0.61, whence the denomination "low-Finesse" Fabry-Perot resonator.

Expanding the algebra in equation. (7), a transfer matrix is obtained:

$$\tilde{M} = \begin{pmatrix} A & B \\ C & D \end{pmatrix} \quad (12)$$

with coefficients:

$$A = \frac{f_C^2 - [L_2 + 2\mathcal{L}_1]f_C + \mathcal{L}_1\mathcal{L}_2}{f_C^2} \quad (13)$$

$$B = \frac{[L_2 + 2\mathcal{L}_1]f_C^2 - 2\mathcal{L}_1[L_2 + 2\mathcal{L}_1]f_C + \mathcal{L}_1^2\mathcal{L}_2}{f_C^2} \quad (14)$$

$$C = \frac{\mathcal{L}_2 - 2f_C}{f_C^2} \quad (15)$$

$$D = \frac{f_C^2 - [2L_1 + \mathcal{L}_2]f_C + \mathcal{L}_1\mathcal{L}_2}{f_C^2} \quad (16)$$

In particular, the expression:

$$2\mathcal{L}_1 + \mathcal{L}_2 = 2(\tilde{i}_m + \tilde{L} + \tilde{i}_c) \quad (17)$$

corresponds to one full roundtrip (optical length) inside the resonator.

The multiple reflections inside the Fabry-Perot resonator have been ignored and have considered just one roundtrip in the context of the invention. The reason for this, at is the very weak amount of light making a second (or more) roundtrip(s).

The first glass-air interface (with first wall 14a) transmits approximately $0.96 I_{in}$, (I represent the Poynting vector of each component). Accounting for the finite reflectivity of the reflective surface (here a mirror) $R_b$, and for the losses at the glass-fluid interface, the intensity exiting the resonator after the first roundtrip is $\approx 0.91 R_b I_{in}$, while the component reflected back into the resonator after the first roundtrip will be $0.04 \times 0.95 R_b I_{in} \approx 0.038 R_b I_{in}$. Thus only approximately 3.8% of the intensity goes for a second roundtrip, thus justifying its removal from the computation of the low-finesse resonator's response.

The radius of curvature $R_{out}$ of the wavefront exiting the resonator after one roundtrip, as a function of the entering wavefront curvature, is (3):

$$R_{out} = \frac{A \cdot R_{in} + B}{C \cdot R_{in} + D} \quad (18)$$

hence, the two wavefronts $R_{in}$ coupled into the resonator by the microscope objective and $R_{out}$ exiting the resonator, can be superposed to compute their circular interference fringes.

The analysing device identifies the values of the distance $\rho$ between a fringe and the optical axis, where constructive interference fringes (bright rings) are expected.

The positions of the two origins for the two emerging waves is arbitrary (the two could be exchanged). The problem is solved in cylindrical coordinates. Intrinsic symmetry considerations justify neglecting the azimuthal angle $\phi$. The distance from the axis is $\rho$.

The distance from the axis $\rho_1$ is defined as the one for which the detection unit detects the first bright fringe:

$$\sqrt{R_{out}^2 + \rho_1^2} - \sqrt{R_{in}^2 + \rho_1^2} = m\lambda \quad (19)$$

where the integer m is defined such that:

$$R_{out} = R_{in} + (m-1)\lambda + \epsilon \quad (20)$$

$$0 \leq \epsilon < \lambda \quad (21)$$

$$m = 1 + \text{Int}\left[\frac{R_{out} - R_{in}}{\lambda}\right] \quad (22)$$

Figure 3:
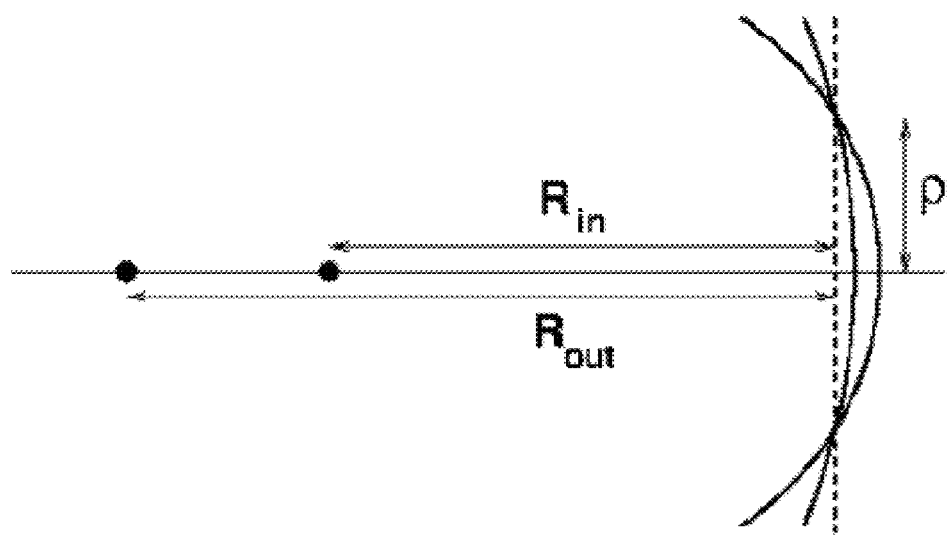
FIG. 3 is a schematic view of the reflected and exiting wavefronts interfering at the plane of the microscope objective of the monitoring device according to the invention.

FIG. 3 is a schematics of the exiting $R_{out}$ and reflected $R_{in}$ wavefronts curvature radii interfering at the plane of the microscope objective. The respective origins for the two curved wavefronts match the radii of curvature. The relative positions are arbitrarily marked, as the value of $R_{out}$ relative to $R_{in}$, depends on experimental parameters. $\rho$ is the coordinate measuring distances from the optical axis.

Solving for $R_{out}$ for two consecutive bright fringes $\rho_1$ and $\rho_2$ (equation (19)):

$$\sqrt{R_{out}^2 + \rho_1^2} - \sqrt{R_{in}^2 + \rho_1^2} = m\lambda \quad (23)$$

$$\sqrt{R_{out}^2 + \rho_2^2} - \sqrt{R_{in}^2 + \rho_2^2} = (m+1)\lambda \quad (24)$$

we obtain:

$$R_{out} = \pm\sqrt{\frac{1}{4k^2}\left[\rho_2^2 - \rho_1^2 - k^2\right]^2 - \rho_1^2} \quad (25)$$

$$k = \lambda + \sqrt{R_{in}^2 + \rho_2^2} - \sqrt{R_{in}^2 + \rho_1^2} \quad (26)$$

Substituting equations. (13) to (16) into equation. (18), a quadratic equation for $f_c$ (equation. (27)), a physical quantity of experimental interest, can be obtained:

$$d_2 f_c^2 + d_1 f_c + d_0 = 0 \quad (27)$$

$$d_2 = (R_{in} - R_{out}) + [\mathcal{L}_2 + 2\mathcal{L}_1] \quad (28)$$

$$d_1 = 2R_{in}R_{out} + (R_{out} - R_{in})[\mathcal{L}_2 + 2\mathcal{L}_1] - 2L_1[\mathcal{L}_2 + \mathcal{L}_1] \quad (29)$$

$$d_0 = (R_{in} - R_{out} + \mathcal{L}_1)\mathcal{L}_2\mathcal{L}_1 - (R_{in}R_{out})\mathcal{L}_2 \quad (30)$$

The cell focal length (CFL) $f_c$ is determined by computing the two roots of the second degree algebraic equation (27):

$$f_c+ = \frac{-d_1 + \sqrt{d_1^2 - 4d_2 d_0}}{2d_2} \quad (31)$$

$$f_c- = \frac{-d_1 - \sqrt{d_1^2 - 4d_2 d_0}}{2d_2} \quad (32)$$

where we make use of the expression for $R_{out}$, eq. (25) in the computation of the coefficients $d_j$.

The cell radius, connected to the focal length of the associated thin lens, is obtained by inverting eq. (6), once the cell refractive index is known:

$$r_c = 2(n_c - n_w)f_c \qquad (33)$$

For example, in order to obtain physical properties of the cell linked to its deformation, the flow inside the channel may be stopped when a cell is aligned with the resonator's axis (while acoustically focused). Then, the interference pattern resulting from the immobile and levitated cell is then acquired, obtaining the information in the absence of deformation. The acoustic wave's amplitude is increased to induce a cell deformation and a new image of the interference pattern is acquired. The cycle is repeated to obtain 20 pairs of patterns for each cell in the absence and in the presence of deformation. The primary acoustic field is predicted to be of order 500 kPA, with associated (oscillating) acoustic displacements of a few nm. These displacements are thus small (and insignificant) in comparison to the cell deformation likely to be created from the non-zero time averaged acoustic radiation force. Hence the Young's Modulus of the cells may be obtained.

Naturally, other embodiments or variants of the invention will appear to a skilled person in the art, such as the use of other lasers or various configurations of the fluidic channel and Fabry-Perot interferometer.

LIST OF REFERENCES

- 8: Monitoring device
- 10: Fluidic channel
- 12: Syringe tubing
- 14a, 14b: Channel walls
- 15: Reflective surface
- 16: Fabry-Perot interferometer
- 18: Piezoelectric transducer
- 21: Detection unit
- 22: Focus lens
- 24: Optical detectors
- 26: Laser-emitting device
- 28: Camera
- B: Beam splitter
- C: Biological cells
- F: Fluid
- L: Laser beam
- M: Mirrors
- P: motion plane of the cells
- W: Acoustic waves

The invention claimed is:

1. A monitoring device of biological cells comprising:
a fluidic channel in which a fluid comprising biological cells is made to flow, the fluidic channel being formed by a first glass wall and a second glass walls placed in parallel and a reflective surface adjoined to the second wall, and
a piezoelectric transducer, said piezoelectric transducer emitting acoustic waves is configured to create a force acting on the biological cells, making them flow along a single motion plane through the fluidic channel,
wherein an external interface of the first glass wall in contact with an exterior of the fluidic channel, and the reflective surface are configured to function as a Fabry-Perot interferometer, the finesse of which is lower than 10, such that the Fabry-Perot interferometer has an optical axis perpendicular to the single motion plane, provides a single set of optics for focusing and retrieval of incident and reflected beams, and there is no need to provide additional mirrors,
the monitoring device further comprising a detection unit detecting a fringe pattern stemming from the Fabry-Perot interferometer, and an analysing device, analysing said fringe pattern and configured to output data on physical properties of the cells based on said pattern.

2. The monitoring device according to claim 1, wherein the frequency of the piezoelectric transducer is set at the fundamental resonance frequency of the fluidic channel.

3. The monitoring device according to claim 1, wherein the analysing device retrieves, from the detected fringe pattern, the distances between the optical axis of the Fabry-Perot interferometer and at least two fringes of the fringe pattern.

4. The monitoring device according to claim 1, wherein the Finesse of the Fabry-Perot interferometer is lower or equal to 1.

5. The monitoring device according to claim 1, wherein the physical properties of the cells are taken from at least one of the following, alone or in combination:
mechanical properties of the cells,
shape of the cells,
refractive index of the cells, and
deformability of the cells.

6. The monitoring device according to claim 1, wherein the reflective surface is sandwiched between the second wall and the piezoelectric transducer.

7. The monitoring device according to claim 1, wherein the optical reflectivity of the reflective surface is above 90%, and the optical reflectivity of the interface between the glass wall and the exterior of the fluidic channel, is above 2%.

8. The monitoring device according to claim 1, further comprising an acoustic reflector for reflecting the acoustic waves emitted by the piezoelectric transducer so that the acoustic waves become stationary within the fluidic channel.

9. The monitoring device according to claim 8, wherein the first wall functions as the acoustic reflector for the acoustic waves emitted by the piezoelectric transducer.

10. The monitoring device according to claim 1, further comprising an acoustic wave frequency modulator configured to modulate the amplitude of the acoustic waves generated by the piezoelectric transducer.

11. The monitoring device according to claim 10, wherein the frequency of the acoustic waves generated by the piezoelectric transducer is set at the resonant frequency of fluidic channel.

12. The monitoring device according to claim 1, further comprising an acoustic wave amplitude modulator configured to modulate the amplitude of the acoustic waves generated by the piezoelectric transducer.

13. The monitoring device according to claim 1, wherein the detection unit comprises at least two optical detectors recording time traces at different points along the motion plane of the biological cells and one camera for calibration.

14. The monitoring device according to claim 1, wherein the optical arrangement comprises a laser-emitting device emitting a laser beam focused by a focus lens into a zone of the Fabry-Perot interferometer, wherein the laser beam is aligned perpendicularly with motion plane.

15. The monitoring device according to claim 14, wherein the focus lens is also used to retrieve a reflected laser beam carrying the detected fringe pattern.

16. The monitoring device according to claim 1, wherein the exterior of the fluid channel comprises air.

17. The monitoring device according to claim 4, wherein the Finesse of the Fabry-Perot interferometer is comprised between 0.5 and 0.7.

18. The monitoring device according to claim 4, wherein the Finesse of the Fabry-Perot interferometer is 0.6.

19. The monitoring device according to claim 7, wherein the optical reflectivity of the reflective surface is 99%, and the optical reflectivity of the interface between the glass wall and the exterior of the fluidic channel is above 4%.

\* \* \* \* \*